(12) United States Patent
Huang

(10) Patent No.: US 11,031,189 B2
(45) Date of Patent: Jun. 8, 2021

(54) AQUEOUS HYBRID SUPER CAPACITOR

(71) Applicant: Chao Huang, Kitchener (CA)

(72) Inventor: Chao Huang, Kitchener (CA)

( * ) Notice: Subject to any disclaimer, the term of this patent is extended or adjusted under 35 U.S.C. 154(b) by 61 days.

(21) Appl. No.: 16/247,322

(22) Filed: Jan. 14, 2019

(65) Prior Publication Data

US 2019/0221377 A1 Jul. 18, 2019

Related U.S. Application Data

(60) Provisional application No. 62/618,547, filed on Jan. 17, 2018.

(51) Int. Cl.
| | | |
|---|---|---|
| *H01G 11/04* | (2013.01) | |
| *H01G 11/30* | (2013.01) | |
| *H01G 11/68* | (2013.01) | |
| *H01M 10/26* | (2006.01) | |
| *H01M 10/30* | (2006.01) | |
| *H01G 11/08* | (2013.01) | |
| *H01G 11/60* | (2013.01) | |
| *H01G 11/58* | (2013.01) | |

(52) U.S. Cl.
CPC ............. *H01G 11/04* (2013.01); *H01G 11/08* (2013.01); *H01G 11/30* (2013.01); *H01G 11/60* (2013.01); *H01G 11/68* (2013.01); *H01M 10/26* (2013.01); *H01M 10/30* (2013.01); *H01G 11/58* (2013.01); *Y02E 60/13* (2013.01)

(58) Field of Classification Search
CPC ........ H01G 11/04; H01G 11/08; H01G 11/60; H01G 11/30; H01G 11/68; H01G 11/58; H01M 10/26; H01M 10/30
See application file for complete search history.

(56) References Cited

U.S. PATENT DOCUMENTS

| | | | |
|---|---|---|---|
| 5,215,836 A | 6/1993 | Eisenberg | |
| 5,453,336 A | 9/1995 | Adler et al. | |
| 9,728,344 B2 * | 8/2017 | Stucky | H01G 11/32 |
| 9,853,325 B2 * | 12/2017 | Sweeney | H01M 10/0562 |
| 10,601,074 B2 * | 3/2020 | Read | H01M 4/0471 |
| 2018/0166760 A1 * | 6/2018 | Santoro | H01G 11/02 |

* cited by examiner

*Primary Examiner* — Michael C Zarroli

(57) ABSTRACT

An aqueous hybrid super capacitor is comprised of a super capacitor positive electrode, a gas generating electrode which has oxygen generating activity, and a zinc negative electrode, separated in an aqueous electrolyte with pH value above 2.5; use the super capacitor positive electrode and the zinc negative electrode to perform cycle of charging and discharging; use the gas generating electrode and the zinc negative electrode to recover capacity of the zinc negative electrode and recondition the zinc negative electrode.

9 Claims, 1 Drawing Sheet

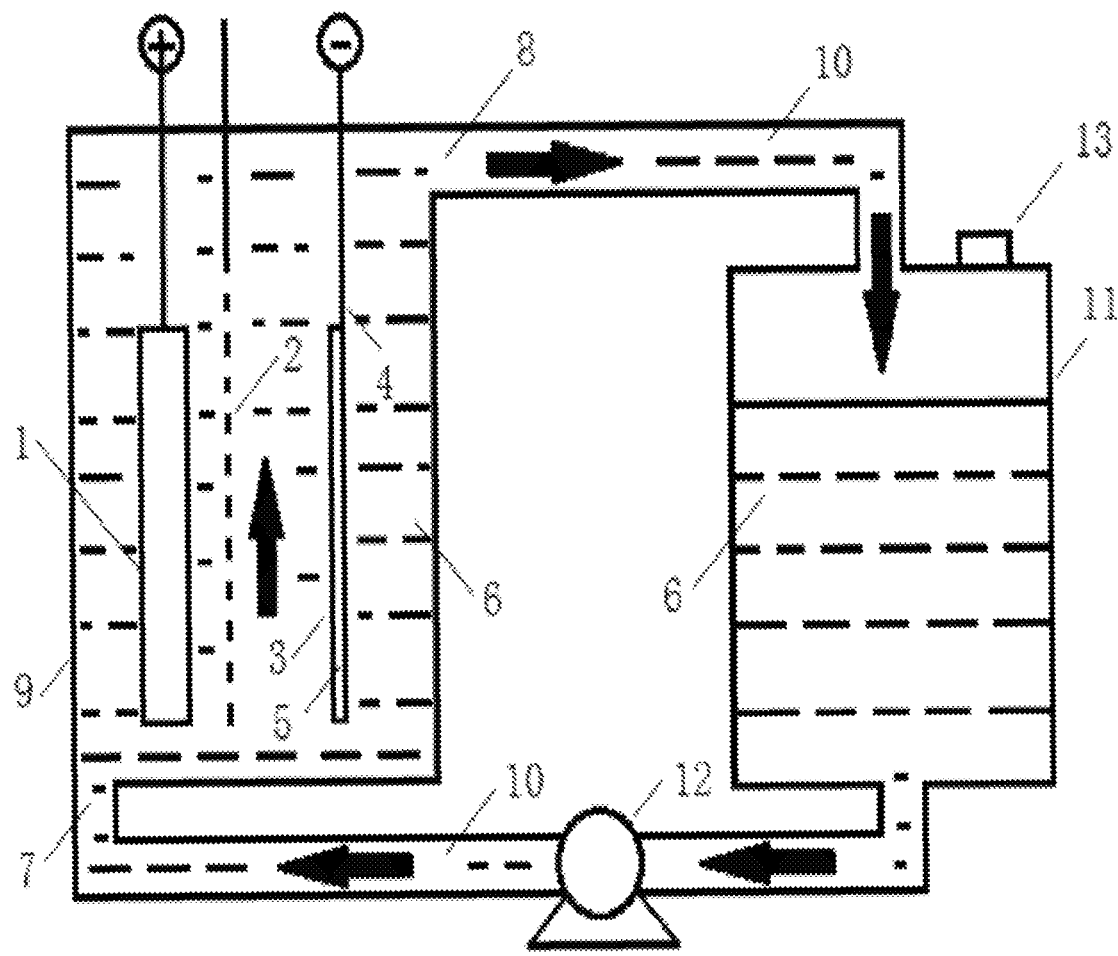

AQUEOUS HYBRID SUPER CAPACITOR

CROSS-REFERENCE TO RELATED APPLICATION

This invention claims the benefits under 35 U.S.C. § 119(e) of U.S. of Provisional Application No. 62/618,547, filed on Jan. 17, 2018. The specification of which is incorporated by reference herein in its entirety for all proposes.

BACKGROUND OF THE INVENTION

1 Field of the Invention

The present invention relates to area of electrochemical energy storage, more particularly relates to an aqueous hybrid super capacitor.

2 Description of the Prior Art

Energy storage technologies are more and more important in fields of energy and transportation as well as the like. Renewable energies such as wind energy and solar energy are intermittent and random, their applications in large scale require economical and endurable energy storage technologies; the load of usage in power grid fluctuates greatly, if there are economical and endurable energy storage technologies to balance the peak and the trough, the installed capacity can be decreased greatly; hybrid and start-stop system on vehicles are difficult for popularization without economical and endurable high power energy storage technologies. It is a pity that all kinds of energy storage technologies nowadays are hard to be popularized for the limitation of cost and life span as well as scale.

Secondary batteries are primarily utilized to realize the transformation between electrical energy and chemical energy in electrochemical energy storage technologies, which are promising in fields of energy and transportation as well as the like as having advantages of high specific energy, quickly responding, without limitation on geographic position and scale. Commonly used secondary batteries include lead acid battery, nickel metal hydride battery, lithium ion battery, generally their cyclic lives are ranging from several tens to several thousands cycles, the energy densities are several tens to several hundreds watt hour/kilogram (Wh/kg), the power densities are below 300 watt/kilogram (W/kg). Lead acid battery is low cost, widely used in starting and backup power; its disadvantages are low energy density, bad ability in deep discharging, limited cyclic life and contaminating environment. Nickel metal hydride battery has relatively high specific power; its disadvantages are relatively high cost, having memory effect to some extent. Lithium ion battery has high energy density, without memory effect, with long cyclic life, extremely widely used in area of portable electrical device; its drawbacks are high cost, bad consistence in battery pack, and having safety risk.

Flow batteries are special forms of secondary batteries, in which dissolved active materials are generally circulated by pumps, charged and discharged on inert electrodes; as the active materials can be stored in containers, they have advantages of strong ability of deep discharging, long cyclic life; there are several forms of flow batteries as all vanadium, zinc bromine, poly sulfur sodium-bromine, and iron chrome as well as so on. After decades of research and development, all vanadium flow battery of and zinc bromine flow battery are still being tried in large scale commercial applications. The drawbacks of all vanadium flow battery are that expensive ion exchanger membranes are required, vanadium containing electrolytes cost high. The advantage of the zinc bromine flow battery is low cost; the drawback is that fluid of bromine is strong in corrosion and harm to environment.

Solid electrolyte is used in sodium sulfur secondary battery, which has advantages of low cost, high energy density; its disadvantages are that the working temperature is about 350 degrees centigrade; the stability of the solid electrolyte is bad in the long run.

In high power energy storage area, nickel metal hydride battery is generally applied in hybrid, its cost is high, and the popularization is hard. For start-stop system of cars, lead acid batteries in forms of Enhanced Flooded Battery (EFB) or Absorbed Glass Mat (AGM) are used, the costs are 1.5 to 3 times that of ordinary starting batteries, often required replacement in 2-3 years.

Super capacitor is a special form of electrochemical energy storage technology, based on "electrical double layer mechanism" or "pseudo electric capacitor mechanism". Large specific surface carbon material or large specific surface metal oxide, conducting plastics, MOFs (metal-organic frameworks) and so on are used as active materials for super capacitor electrodes. The symmetric super capacitor is comprised of two same single super capacitor electrodes; its power density can reach 10-100 times that of battery, with cyclic life over 100,000 cycles, without memory effect, enduring deep charging and discharging; its disadvantage is high cost, pricing about 5 times that of lithium-ion battery in same capacity, with low energy density of only 1 Wh/kg to 5 Wh/kg about.

Large scale energy storage ordinarily requires that the energy storage devices should reach about 4000 times in cyclic life, the cost should be less than 500 USD per kilowatt hours in near future, reach 125-250 per kilowatt hours in far future. United States Advanced Battery Consortium USABC and Department of Energy DOE have set up standard demands for hybrid vehicle auxiliary energy system that are working with power over 625 W/kg lasting 10 second, with total energy of 7.5 Wh/kg, being able to work regularly and safely between temperature of −30 to +52 degrees centigrade. Traditional secondary batteries and super capacitors still cannot meet the demands.

Hybrid super capacitor is constructed with a single electrode of super capacitor and a single electrode of battery cooperatively, it combines features of high power density and extremely long cyclic life that is from electrode of super capacitor, with high energy density that from electrode of battery, provides a new direction for large scale energy storage and high power energy storage.

Lithium ion hybrid super capacitor is constructed with a positive electrode of active carbon and a negative electrode of graphite in organic electrolyte contained lithium ion while the electrical double layer capacitor charging and discharging in positive electrode, lithium ion intercalating in and out reaction occurs on negative electrode; the energy density is much higher than that of the super capacitor in symmetric form, its drawbacks are high cost and having safety risk.

Aqueous electrolyte is employed in an aqueous hybrid super capacitor, of which advantages are low cost, safety and reliability, ease of production. Current aqueous electrolyte hybrid super capacitors still have many problems. In a nickel carbon electric capacitor battery, with nickel electrode used as positive electrode and active carbon as negative electrode, the drawback is high cost. In a lead carbon hybrid super capacitor, a lead oxide electrode is used as positive electrode and an active carbon electrode as negative electrode, the drawbacks are that the positive electrode is detached easily and there is contamination of lead and sulfur acid. An aqueous hybrid super capacitor was disclosed in China patent with publishing number CN101515507A, using a super capacitor electrode as the positive electrode and a hydrogen storing alloy electrode as the negative electrode, its drawback is the voltage is relatively low and the cyclic life is not ideal. An aqueous hybrid super capacitor was disclosed in China patent "electrochemical hybrid energy storage device" (CN103996854A), in which an active carbon electrode was used as the positive electrode and a zinc negative electrode as the negative electrode; its drawback is that the cycle life is not long for the limitation of zinc negative electrode.

Zinc is rich in resources and cheap in cost, its standard electrode potential in aqueous electrolyte is as low as −0.763 volt, its overpotential of hydrogen generating is as high as 1.2 volt; zinc negative electrode has high energy storing density and big discharge current density as well as wide working temperature rang. Zinc negative electrode has been widely used in all kinds of primary batteries such as dry battery since Volta invented battery 200 years ago.

The secondary batteries that using zinc negative electrode such as sliver-zinc and nickel-zinc batteries, have only several tens to several hundreds cycles of working life. The acknowledged main reasons of bad cyclic life of zinc negative electrode are that the solubility of divalent zinc in aqueous solution is high, concentration polarization results in distortion, dendrite and passivation of the zinc negative electrode; according to such opinions, the methods of adding fluorides, carbonates, borides to decrease the solubility of divalent zinc in aqueous solution were employed in U.S. Pat. Nos. 5,453,336 and 5,215,836, methods of flowing electrolyte were used to overcome distortion and dendrite of the zinc negative electrode in China Patent CN100550479C and CN105336971. These methods to prolong life span of zinc negative electrode have effects of improvement to some extent when being utilized on an aqueous hybrid super capacitor with zinc negative electrode; however, the problem of short life of hybrid super capacitor with zinc negative electrode are still unable to be solved.

The advantages of the aqueous hybrid super capacitor with zinc negative electrode are low cost, high power density, far higher energy density than that of symmetric aqueous super capacitors, strong ability on deep charging and discharging, being rich in resources and without pollution; In spite of many advantages, its cyclic life is far from meeting the demands for large scale energy storage and high power energy storage. Prior art is still unable to solve the puzzle of short life of aqueous hybrid super capacitor with zinc negative electrode thoroughly.

BRIEF SUMMARY OF THE INVENTION

The object of the present invention is to solve the problem of short cycle life of aqueous hybrid super capacitor with zinc negative electrode, provide an hybrid super capacitor which has long life span, low cost, high power density, relatively high energy density, strong capability of deep charging and discharging, and without pollution for large scale energy storage and high power energy storage.

The technical solution disclosed in the present invention is: a hybrid super capacitor is comprised of at least a super capacitor positive electrode, at least a gas generating electrode which has oxygen generating activity, at least a zinc negative electrode, separated in an aqueous electrolyte with pH value above 2.5; use the super capacitor positive electrode and the zinc negative electrode to perform cycle of charging and discharging, use the gas generating electrode and the zinc negative electrode to charge for recovering the capacity the of the zinc negative electrode.

The further technical solution disclosed in the present invention is: on the basis of above technical solution, connect the gas generating electrode which has both oxygen generating activity and hydrogen generating activity with zinc negative electrode in outer circuit to discharge, consume metallic zinc to prevent the over growing of zinc.

Said oxygen generating activity is referred to that when the electrode loses electrons, it can oxidize water in electrolyte, release oxygen; said hydrogen generating activity is referred to that when the electrode get electrons, it can reduct water in electrolyte, release hydrogen; said super capacitor positive electrode is referred to the positive electrode based on "electrical double layer mechanism" or "pseudo electric capacitor mechanism", that large specific surface carbon or large specific surface metal oxide, conducting plastics, MOFs (metal-organic frameworks) and so on are used as active materials in it; said zinc negative electrode is referred to the negative electrode that zinc is used as active material in it.

According to the present invention, use gas generating electrode and zinc negative electrode to charge, capacity of zinc negative electrode can be recovered under the condition that the super capacitor positive electrode is not damaged; take advantage of the activity of hydrogen generating that gas generating electrode also has, connect gas generating electrode with zinc negative electrode in outer circuit to discharge, metallic zinc can be consumed to prevent over growing of zinc; after discharging, start recovery charging with gas generating electrode and zinc negative electrode, reconditioning of the hybrid super capacitor can be realized. By periodic process of recovery charging and reconditioning of zinc electrode, extremely long cyclic life of zinc negative electrode can be ensured.

The beneficial effect of the present invention is remarkable. In spite of increasing element of hybrid super capacitor, the present invention can fundamentally solve the problem that hybrid super capacitor with zinc negative electrode is unable to have long cycle life, under the condition of very few cost increasing. Only if the current collector of zinc negative electrode is not destroyed, zinc negative electrode can always being able to be used, this hybrid super capacitor has a cycle life that is similar as that of symmetric super capacitor, far longer than the cycle life of ordinary batteries and other hybrid super capacitor.

Cheap active materials can be used in the present invention such as active carbon and zinc as well as the like; preferably under the condition of alkaline aqueous solution, metallic materials such as nickel plated steel, stainless steel, nickel and the like are used as current collectors for positive electrode and gas generating electrode; metallic materials such as brass or copper and the like are used as current collector of negative electrode, electro deposit to form zinc negative electrode; this hybrid super capacitor has cheap cost, the power cost is far lower than that of the symmetric super capacitor, the energy cost is relatively low; being able to work under low temperature condition.

Metallic material can be used as current collectors in this invention, its electric resistivity is low, the both two faces of the positive and the negative can be used, the electric current can be conducted from the top or the sides of it, and it is easy to perform connection in parallel and in series, to simplify the system structure.

The present invention has thoroughly solved the problem that cyclic life of hybrid super capacitor with zinc negative electrode can not be long, provide an aqueous hybrid super capacitor with extremely long cyclic life, low cost, high power density, relatively high specific energy, strong ability on deep discharging, be rich in resources, without environment pollution, wide range of working temperature, be assembled and connected easily, being able to meet requirement for large scale energy storage and high power energy storage; it is suitable to be applied in renewable energy, smart power grid, start-stop technology for cars, hybrid and the like.

BRIEF DESCRIPTION OF THE DRAWING

The drawing is an aqueous hybrid super capacitor with zinc negative electrode in electrolyte circulation mode, according to the present invention.

In the drawing: 1. super capacitor positive electrode, 2. gas generating electrode, 3. zinc negative electrode, 4. current collector of zinc negative electrode, 5. zinc layer of electro-deposition, 6. electrolyte solution, 7. inlet of electrolyte solution, 8. outlet of electrolyte solution, 9. housing of hybrid super capacitor, 10. duct of electrolyte solution, 11. reservoir of electrolyte solution, 12. pump of electrolyte solution, 13. gas plug.

DETAILED DESCRIPTION OF THE INVENTION

Solving the short cyclic life problem of zinc negative electrode has always been an acknowledged puzzle in electrochemical energy storage area.

The acknowledged main reasons for short cycle life of zinc negative electrode are that the solubility of divalent zinc in aqueous solution is high, concentration polarization results in distortion, dendrite and passivation on the zinc negative electrode; corrosion of zinc is regarded as a minor reason; according to such opinions, methods of reducing the solubility of the divalent zinc were used, or flowing mode of electrolyte was employed on hybrid super capacitor with zinc negative electrode, its life span was still not ideal.

After repeated failed experiments, the inventor of the present invention had realized the reasons for the short cyclic life of hybrid super capacitor with zinc negative electrode is more complicated than imagined, prior art is yet unable to solve the problem with complicated reasons. After repeated thinking and exploring on experiments, the inventor of the present invention finally discovered a fact that far beyond acknowledged expectation: the long-term effect of hydrogen generating side reaction that related to water is neglected in an aqueous hybrid super capacitor with zinc negative electrode; the capacity of zinc negative electrode is decreased for reasons such as corrosion of metallic zinc, trying to solve the capacity decrease of zinc negative electrode will damage the positive electrode and make the zinc negative electrode unstable, prior art is unable to solve these complicated problems, that is the root reason why aqueous hybrid super capacitor with zinc negative electrode can not have a long cyclic life.

Cyclic charging and discharging process of aqueous hybrid super capacitor with zinc negative electrode theoretically are that charging and discharging of "electric double layer capacitor" or "pseudo electric capacitor" occur on positive electrode, while oxidation-reduction reactions of zinc occur on zinc negative electrode. For instance, in super capacitor positive electrode of active carbon positive electrode: when charging, the super capacitor positive electrode loses electrons in outer circuit, surface electric charges on the electrode attract negative ions in electrolyte; zinc negative electrode receives electrons from outer circuit, divalent zinc in electrolyte is transformed to metallic zinc deposited on negative electrode. When discharging, the super capacitor positive electrode receives electrons in outer circuit, surface electric charges on the electrode attract positive ions in electrolyte; zinc negative electrode loses electrons in outer circuit, the metallic zinc on electrode loses electrons transformed to divalent zinc and dissolved in electrolyte.

In fact, besides zinc negative electrode taking part in above cyclic charging and discharging, metallic zinc can also reduct water in electrolyte, make hydrogen generating reaction happen, changed into divalent zinc; this part of decrease of metallic zinc is not accompanied with the capacitor process of the super capacitor positive electrode, only corresponding to the reaction of hydrogen generating while water was reduced; when the amount of metallic zinc decreased to some extent, the electric potential of negative electrode goes up, electric resistance increases, voltage of whole hybrid super capacitor decreases, discharging is terminated earlier, the result is that super capacitor positive electrode cannot be discharged sufficiently; in the next charging, voltage changing range of super capacitor positive electrode will be narrower, capacity of charging will decrease significantly, the result is that capacity of whole hybrid super capacitor will decrease further.

Distortion, dendrite and passivation of zinc negative electrode can be improved or solved by adjusting components of electrolyte, by utilizing modes of circulating electrolyte or vibrating and the like, but the hydrogen generating corrosion of zinc can not be avoided in aqueous electrolyte solution, the hydrogen generating reaction is ceaseless even when standing for storing. The hydrogen generating reaction is relatively slow, is prone to be neglected; however, long-term effect certainly results in decreasing of load capacity and shortening of working life. Storing under the condition of 25 degrees Celsius, porous zinc negative electrode in alkaline electrolyte may lose 10% capacity in one month because of hydrogen generating corrosion. The decreasing of the capacity can only be postponed by adding inhibitor of corrosion or by adding excessive metallic zinc in advance, but can not be fundamentally overcame.

If the electric potential of the super capacitor positive electrode surpassing the electric potential of oxygen generating when charging, the reaction of oxygen generating will occur, more divalent zinc will be transformed into metallic zinc on negative electrode, this can supplement the loss of metallic zinc caused by hydrogen generating corrosion, recovering capacity of zinc negative electrode; however, oxygen generating reaction will result in over-oxidization of active materials of super capacitor positive electrode and generating of bubble, damaging the super capacitor positive electrode; the result will be that whole capacity of hybrid super capacitor is decreased, the cyclic life shortened; meanwhile such a charging process is hard to be controlled, if oxygen generating is not enough, the recovery for capacity of zinc negative electrode will not be sufficient; if oxygen generating is over enough, metallic zinc deposited be over thick, possibly cause the connection of the positive electrode and the negative electrode in electrolyte, the hybrid super capacitor will be destroyed.

So that in prior art, relying on charging and discharging with super capacitor positive electrode and zinc negative is unable to recover zinc negative electrode on the condition that super capacitor positive electrode is not be damaged, the problem of short cycle life of hybrid super capacitor with zinc negative electrode cannot be solved fundamentally.

After repeated thinking and exploring on experiments, the inventor of the present invention finally discovered above mechanism which is far beyond acknowledged expectation, found the root reason why cycle life of hybrid super capacitor with zinc negative electrode can not be long; furthermore, innovatively add an gas generating electrode which has oxygen generating activity in hybrid super capacitor to solve the short life problem of the zinc negative electrode. Charge using the gas generating electrode and zinc negative electrode, oxygen generating on the gas generating electrode, divalent zinc transformed into metallic zinc on zinc negative electrode, recover the capacity of zinc negative electrode; super capacitor positive electrode and gas generating electrode are separated, the super capacitor positive electrode is not involved in the charging of recovery, the super capacitor positive electrode can not be damaged.

In order to fully utilize active materials of the super capacitor positive electrode, compared with the capacity of super capacitor positive electrode, generally the capacity of formed zinc negative electrode is in excess, whole capacity of hybrid super capacitor is determined by the capacity of the super capacitor positive electrode, the starting time and electric quantity of oxygen generating charging for recovery can be determined by experiments.

It is preferred that according to testing experiences of experiments on decreasing of whole capacity of hybrid super capacitor and capacity of zinc negative electrode, when ensuring that the capacity of zinc negative electrode is decreasing but still over the capacity of super capacitor electrode, perform charging for recovering capacity of zinc negative electrode periodically, excessive capacity of zinc negative electrode can be recovered while whole capacity of hybrid super capacitor is not decreased.

When to perform recovery charging can also be determined according to capacity decreasing condition of the cyclic charging and discharging of hybrid super capacitor; for instance, when discharging capacity of hybrid super capacitor have decreased 5%-20%, perform charging for recovery of capacity.

The period and electric quantity of recovery charging can also be determined by measuring the amount of hydrogen generated from hybrid super capacitor to calculate the corrosive extent of zinc negative electrode.

Use above methods or their combined, to determine starting time and electric quantity in periodical performing of capacity recovery for zinc negative electrode, make sure the capacity recovery surpassing capacity decreasing each time, the ceaseless capacity decreasing of zinc negative electrode can be prevented; when recovery capacity cannot be balanced with decreasing capacity of zinc negative electrode, after several such recoveries, the thickness of deposits on zinc negative electrode will gradually increase. When the thickness increases to some extent, stop charging of recovery, or decrease recovery capacity each time, or keep standing, the thickness of zinc can always be decreased. Although realizing the balance between capacity decreased of zinc negative electrode and capacity recovered in each time is difficult, the balancing in the long run can be ensured by adjusting.

The much better method is making gas generating electrode also have relatively high hydrogen generating activity beside its oxygen generating activity; for instance, using foam nickel and nickel net, or using stainless steel net with which the foam nickel or nickel net is connected or processed together. Stainless steel net has relatively high activity of oxygen generating and relatively low hydrogen generating activity, nickel containing materials have relatively high activity of oxygen generating and relatively high hydrogen generating activity such as foam nickel and nickel net.

The gas generating electrode is preferably placed between the super capacitor positive electrode and the zinc negative electrode; take advantage of the hydrogen generating activity that gas generating electrode also has, when deposits of zinc layer become thick enough to touch gas generating electrode and conducting of electrons occurs, hydrogen generating reaction will happen, gas generating electrode receives electrons, reducing water and releasing hydrogen, metallic zinc on the negative electrode losses electrons, changed into divalent zinc, solved into electrolyte, metallic zinc consumed, inhibiting over-depositing of zinc.

Utilizing the hydrogen generating activity that gas generating electrode also has, over-thick zinc layer can be positively eliminated, realizing reconditioning of the zinc negative electrode. When zinc negative electrode deposited to a certain thickness, for example, after a period of working or when zinc layer touching gas generating electrode, connect the gas generating electrode with zinc negative electrode in outer circuit to discharge; on such an occasion, gas generating electrode receives electrons from outer circuit, reducing water and releasing hydrogen, metallic zinc on the zinc negative electrode losses electrons, changed into divalent zinc and solved into electrolyte; after a period of discharging, zinc layer can be decreased thinned, fully discharging can thoroughly consume the deposited zinc layer, only current collector of the zinc negative electrode is remained. Charge with gas generating electrode and zinc negative electrode cooperatively after discharging, depositing enough metallic zinc on current collector of zinc negative electrode, thorough reconditioning of the zinc negative electrode can be realized.

Utilizing gas generating electrode and zinc negative electrode to charge, by controlling the times and capacity of recovery charging, the capacity decreasing problem of the zinc negative electrode can be solved. Utilizing gas generating electrode and zinc negative electrode to discharge positively, eliminate the over-thick zinc layer then charge for recovery, reconditioning of discharging for the zinc negative electrode can be realized.

By cooperating the gas positive electrode with zinc negative electrode, perform recovery charging and reconditioning of discharging periodically can solve the capacity decrease of the zinc negative electrode thoroughly that caused by all kind of reasons such as corrosion, passivation, distortion and the like on zinc negative electrode, solve the problem caused by over growing and dendrite of the zinc negative electrode thoroughly, the problem that life of zinc negative electrode is unable be long can be solved fundamentally, only if the current collector is not destroyed, zinc negative electrode will always being able to be used, having a extremely long cycle life.

Membranes or pored insulator materials can be used to separate these electrodes. Preferably, net or fence or porous sheet is used, made of materials as plastics and rubber and so on, to increase the ionic conductivity, and decrease cost.

Water solution with pH value above 2.5 is used as the aqueous electrolyte; it can be electrolyte of acid, salt, alkaline and the like or these combined, adding divalent zinc ion is as preferred as active material for zinc negative electrode; diffluent components or their combined can be contained in the electrolyte solution, such as potassium ion, sodium ion, lithium ion, sulfate ion, nitrate ion and so on;

inhibiting components for hydrogen generating corrosion of zinc can be added in the electrolyte solution or on negative electrode, such as elements of indium, bismuth, tin, lead and so on. Other solvents for adjusting freezing point can be partly added in, for example alcohols such as glycol, glycerol and so on.

As preferred, strongly basic electrolyte solution is used, such as aqueous solution of potassium hydroxide, sodium hydroxide, lithium hydroxide, or these combined; the concentration is generally between 0.5 mol/L and 10 mol/L, divalent zinc component is added therein, for instance, zinc oxide is dissolved in aqueous solution of potassium hydroxide.

As preferred, to decrease the ionic resistance, gas generating electrode is in form of net or fence and so on that being able to be penetrated by electrolyte, placed between super capacitor positive electrode and zinc negative electrode.

Metallic materials with low overpotential of oxygen generating can be used for the gas generating electrode, such as stainless steel, nickel, nickel plated steel slice; As preferred, pored stainless steel materials such as stainless steel mesh or fence are used as the gas generating electrode.

Nickel containing materials such as foam nickel and nickel net have relatively high activity of hydrogen generating and oxygen generating together, stainless steel material has higher activity of oxygen generating and a certain degree of hydrogen generating activity together. Preferably metallic materials that have both low hydrogen generating overpotential and low oxygen generating overpotential were used as gas generating electrode that have both activity of hydrogen generating and oxygen generating activity, such as nickel, nickel plated stainless steel, nickel plated steel; or above materials combined; for instance: foam nickel partly clamped on stainless steel net, or foam nickel, nickel net connected together with stainless steel net.

All kinds of electrode materials loaded with catalysts of hydrogen generating and oxygen generating can also be used as gas generating electrode, for instance, carbon material such as graphite, oxides as ferroferric oxide, composite materials as plastic combined with carbon, pitch combined with carbon, or above materials combined.

For active materials of the super capacitor positive electrode, large specific surface carbon materials that have "electric double layer capacitor mechanism" or "pseudo electric capacitor mechanism", or large specific surface metal oxide, conducting plastics, MOFs (metal-organic frameworks), or above materials combined can be used; Active carbon, manganese oxides are preferred active materials from consideration of cost.

As preferred, metallic materials containing nickel are used as current collectors of the super capacitor positive electrode; pure nickel as foam nickel, nickel screen, nickel slice can be used; nickel plated steel or ferric materials can be used. As preferred, stainless steel material is used as current collector of the super capacitor positive electrode.

The super capacitor positive electrode can be in all kinds of electrode form, such as pressing electrode, glue electrode, flow electrode, half solid electrode and so on.

Metallic zinc or divalent zinc is used as active material of the zinc negative electrode, for instance, metallic zinc powder, electrodeposited metallic zinc on current collector, zinc oxides, divalent zinc in solution, or above materials combined. The current collector of the zinc negative electrode can be in form of sheet or net. As preferred, materials of brass or copper, or stainless steel, or steel are used as current collector of zinc negative electrode, the surface of which can be plated with metals of high hydrogen generating overpotential such as indium, bismuth, tin, lead and the like.

As preferred, the zinc negative electrode can be made by following method: connect gas generating electrode with the positive electrode of charging power source, connect current collector of zinc negative electrode with the negative electrode of charging power source, charge to form a zinc negative electrode in form of electro-deposition.

As preferred, push the electrolyte solution to flow by mechanical force continuously or periodically; electrolyte flowing direction is preferably from positive electrode to negative electrode. Methods of vibrating the electrolyte solution can also be used to decrease polarization, increasing the electric current density.

A gas plug can be fixed on the electrolyte reservoir as that of silver zinc battery; in the gas plug, a check valve can be fixed or a selectively permeable membrane that is not permeable for carbon dioxide can be fixed, to prevent penetrating of carbon dioxide into reservoir; combining reactions of oxygen generating reaction and hydrogen generating reaction equals to the process of water electrolysis, it consumes water. An inner catalytic device can be fixed, to catalyze chemical combination of hydrogen and oxygen, the water produced can be ducted back into electrolyte; if these gases are released off, supplemental water can be added to electrolyte for long-term running.

EXAMPLES

Following examples can be further illustrations for the present invention, they have no limitations to forms of the present invention, and the present invention can be performed in other forms under the precondition that not beyond technical solutions demanded by the claims.

Example 1

The hybrid super capacitor was assembled as the drawing.

Preparation of super capacitor positive electrode 1: active carbon of high iodine value was used as the active material, acetylene black as the conductive agent, polyvinylidene fluoride (PVDF) as the binder, using N-Methylpyrrolidone (NMP) as solvent for PVDF; mixed up in ratio of weight of active carbon:acetylene black:PVDF=80:10:10, added NMP and stirred up to make a paste for making membrane; coated the paste on a current collector of foam nickel, hot pressed at 160 degrees centigrade under pressure of 10 MPa, dried to form an electrode.

Gas generating electrode 2: a foam nickel was clamped and pressed onto an 80 mesh screen of 304 stainless steel to form a gas generating electrode that has both oxygen generating activity and hydrogen generating activity; current collector of zinc negative electrode 4: was a brass sheet with thickness of 0.1 mm; electrolyte solution 6 was an aqueous solution of 30% potassium hydroxide, that contained 1.5% zinc oxide (concentration of weight).

Using fixture of filter pressing structure, separated super capacitor positive electrode 1 and gas generating electrode 2 with a 1 mm thick rubber plate that had a flow channel cut in the middle, separated gas generating electrode 2 and current collector of zinc negative electrode 4 with a 3 mm thick rubber plate that had a flow channel in the middle, no membrane for electrodes was used; employed two 7 mm thick end plates of polymethyl methacrylate (PMMA) that had inlet of electrolyte solution 7 and outlet of electrolyte solution 8 to clamp these rubber plates forming the housing of hybrid super capacitor 9, a constant flow pump was used as the pump of electrolyte solution 12, connected up the duct of electrolyte solution 10 and reservoir of electrolyte solution 11 that had a gas plug 13. Electrolyte solution 6 flowed from super capacitor positive electrode 1 to gas generating electrode 2 and zinc negative electrode 3; a battery tester was used to control charging and discharging.

Preparation of zinc negative electrode 3: connected gas generating electrode 2 with the positive electrode of battery tester, current collector of zinc negative electrode 4 connected with the negative electrode of battery tester; charged with stable electric current of 20 mA/cm$^2$ for 5 hours, oxygen was produced on gas generating electrode 2, zinc negative electrode 3 was formed as zinc layer of electro-deposition 5 generated on current collector of negative electrode 4.

Cyclic charging and discharging of super capacitor positive electrode 1 and zinc negative electrode 3: connected super capacitor positive electrode 1 with the positive electrode of battery tester, connected zinc negative electrode 3 with the negative electrode of battery tester; charged with stable electric current of 350 mA/cm$^2$ until voltage reached 1.50 Volt, then discharged with stable electric current of 350 mA/cm$^2$ until voltage dropped to 0.45 Volt, repeated cyclic charging and discharging 1250 times.

Recovery of zinc negative electrode 3: connected gas generating electrode 2 with the positive electrode of battery tester, connected zinc negative electrode 3 with the negative electrode of battery tester, and charged with stable electric current of 20 mA/cm$^2$ for 1 hour, electro-deposited metallic zinc on zinc negative electrode 3 to recover the capacity.

After hybrid super capacitor working for each 14 hours, turned off battery tester and pump of electrolyte solution 12 to keep standing for 10 hours then continued working; once performing cyclic charging and discharging of super capacitor positive electrode 1 and zinc negative electrode 3 for 1250 times, performed recovery of zinc negative electrode 3 one time, and so alternated. After 3 times recoveries of zinc negative electrode 3 and finished the fourth round of 1250 cyclic charging and discharging, the cyclic charging and discharging had been done 5000 times, on such an occasion, performed "strip" discharging and reconditioning of zinc negative electrode 3 once;

"Strip" discharging and reconditioning of zinc negative electrode 3: connected gas generating electrode 2 with zinc negative electrode 3 in outer circuit through a multimeter, DC rang of multimeter was used, discharged until DC current was 0 mA, then connected gas generating electrode 2 with the positive electrode of battery tester, connected current collector of zinc negative electrode 4 with the negative electrode; charged with stable electric current of 20 mA/cm$^2$ for 5 hours, oxygen was produced on gas generating electrode 2, zinc negative electrode 3 was rebuilt when zinc layer of electro-deposition 5 was deposited on current collector of the zinc negative electrode 4.

Then performing above alternated cyclic charging and discharging and recovery again, until the total amount of cyclic charging and discharging had reached 10000, the capacity of hybrid super capacitor then was as same as that of the first recovery; for cyclic charging and discharging of super capacitor positive electrode 1 and zinc negative electrode 3, the efficiency of electric current was above 99%, power density of discharging was about 2.0 kilowatts per square meter of electrode area; energy density of discharging was about 24.4 Wh/kg, calculated by the weight of active carbon.

Example 2

Using the hybrid super capacitor of the example 1 continued to test, only altered the conditions of cyclic voltage and recovery charging electric current, and recalculated the cyclic number.

Cyclic charging and discharging of super capacitor positive electrode 1 and zinc negative electrode 3: charged with stable electric current of 125 mA/cm$^2$ until voltage reached 1.45 Volt, discharged with stable electric current of 125 mA/cm$^2$ until voltage dropped to 0.45 Volt, repeated cycle 1000 times.

Recovery of zinc negative electrode 3: connected gas generating electrode 2 with the positive electrode of battery tester, connected zinc negative electrode 3 with the negative electrode of battery tester; charged with stable electric current of 15 mA/cm$^2$ for 1 hour, electro-deposited metallic zinc on zinc negative electrode 3 to recover the capacity.

After hybrid super capacitor working for each 14 hours, turned off battery tester and pump of electrolyte solution 12 to keep hybrid super capacitor standing for 10 hours then continued working; once performing cyclic charging and discharging of super capacitor positive electrode 1 and zinc negative electrode 3 for 1000 times, performed recovery of zinc negative electrode 3 one time; so alternated cycles and recovery for 10 times, after the 10th recoveries, the capacity of hybrid super capacitor was the same as that of the first recovery, completely recovered. The total cyclic charging and discharging of super capacitor positive electrode 1 and zinc negative electrode 3 had reached 10000 times, the efficiency of electric current was about 100%, the efficiency of energy was about 64%, the power density of discharging was about 0.9 kilowatts per square meter of electrode area; the energy density of discharging was about 28.1 Wh/kg, calculated by the weight of active carbon.

Example 3

Preparation of super capacitor positive electrode 1: changed the current collector of foam nickel to a current collector of 350 mesh 304 stainless steel screen in preparation of super capacitor positive electrode 1 of example 1, the others were same.

Gas generating electrode 2: was an 80 mesh screen of 304 stainless steel; current collector of zinc negative electrode 4: was a brass sheet with thickness of 0.1 mm; electrolyte solution 6 was an 6 mol/L potassium hydroxide aqueous solution that contained saturated zinc oxide, contained 100 ppm indium sulfate.

The hybrid super capacitor was assembled as same as example 1.

Preparation of zinc negative electrode 3: connected gas generating electrode 2 with the positive electrode of battery tester, connected current collector of zinc negative electrode 4 with the negative electrode; charged with stable electric current of 20 mA/cm$^2$ for 4 hours.

Cyclic charging and discharging of super capacitor positive electrode 1 and zinc negative electrode 3: charged with stable electric current of 125 mA/cm$^2$ until voltage reached 1.55 Volt, discharged with stable electric current of 125 mA/cm$^2$ until voltage dropped to 0.40 Volt, repeated cycle; cycled 1350 times.

Recovery of zinc negative electrode 3: connected gas generating electrode 2 with positive electrode of battery tester, connected zinc negative electrode 3 with negative electrode of battery tester; charged with stable electric current of 20 mA/cm$^2$ for 2 hours.

After hybrid super capacitor working for each 14 hours, turned off battery tester and pump of electrolyte solution 12 to keep hybrid super capacitor standing for 10 hours then continued working; once performing cyclic charging and discharging of super capacitor positive electrode 1 and zinc negative electrode 3 for about 1350 times, performed recovery of zinc negative electrode 3 one time, so alternating cycles and recovery, after the 13th round of recovery, the capacity was 93% that of the first recovery. The total amount of cyclic charging and discharging of super capacitor positive electrode 1 and zinc negative electrode 3 had reached 17550, the efficiency of electric current was about 100%, the efficiency of energy was about 65%; the power density of discharging was about 0.9 kilowatts per square meter of electrode area; the energy density of discharging was about 31.1 Wh/kg, calculated by the weight of active carbon.

Example 4

Preparation of the super capacitor positive electrode 1: active carbon of high iodine value was used as the active material, acetylene black as the conductive agent, polytetrafluoroethylene (PTFE) as adhesive, diluted 60% PTFE emulsion of weight concentration 5 times with alcohol; mixed up in ratio of weight of active carbon:acetylene black:PTFE=75:20:5, added in alcohol to wet and mixed them homogenized, made a positive electrode membrane by method of rolling and pressing, after drying, pressed the membrane by pressure machine under pressure of 10 MPa, the thickness of membrane was 1.58 mm, pressed onto current collector of an 80 mesh 304 stainless steel screen, formed the super capacitor positive electrode 1.

Gas generating electrode 2 was a foam nickel which is pressed flat under pressure of 10 MPa. Current collector of zinc negative 4 and electrolyte solution 6 were as same as example 3.

The hybrid super capacitor was assembled as same as example 1.

Preparation of zinc negative electrode 3: connected gas generating electrode 2 with the positive electrode of battery tester, current collector of zinc negative electrode 4 connected with the negative electrode of battery tester; charged with stable electric current of 10 mA/cm$^2$ for 6 hours, zinc negative electrode 3 was formed as zinc layer of electrodeposition 5 generated on current collector of negative electrode 4.

Cyclic charging and discharging of super capacitor positive electrode 1 and zinc negative electrode 3: charged with stable electric current of 10 mA/cm$^2$ until the voltage reached 1.55 Volt, discharged with stable electric current of 10 mA/cm$^2$ until the voltage dropped to 0.40 Volt; cycled for 70 times.

Recovery of zinc negative electrode 3: connected gas generating electrode with the positive electrode of battery tester, connected the current collector of negative electrode with the negative electrode of battery tester; charged with stable electric current of 10 mA/cm$^2$ for 2 hours, electrodeposited metallic zinc on zinc electrode 3.

After hybrid super capacitor working for each 14 hours, turned off battery tester and pump of electrolyte solution 12 to keep hybrid super capacitor standing for 10 hours then continued working; once performing of super capacitor positive electrode 1 and zinc negative electrode 3 for 70 times, performed recovery of zinc negative electrode 3 one time, so alternated charging and discharging cycles and recovery; after the 8th round cycles, performed "strip" discharging and reconditioning of zinc negative electrode 3 once.

"Strip" discharging and reconditioning of zinc negative electrode 3: connected gas generating electrode 2 with zinc negative electrode 3 in outer circuit through a multimeter, DC rang of multimeter was used, discharged until DC current was 0 mA, then connected gas generating electrode 2 with the positive electrode of battery tester, connected current collector of zinc negative electrode 4 with the negative electrode; charged with stable electric current of 10 mA/cm$^2$ for 6 hours.

Then performing above alternated cyclic charging and discharging and recovery again, after the 16th round cyclic charging and discharging, performed "strip" discharging and reconditioning of zinc negative electrode 3 the second time; Then performing above alternated cyclic charging and discharging and recovery, after the 24th round cyclic charging and discharging, the capacity of hybrid super capacitor then was above 90% that of the first recovery. The total amount of cyclic charging and discharging had reached 1680, the efficiency of electric current was about 100%, the efficiency of energy was about 68%; and the energy density of discharging was about 29.5 Wh/kg, calculated by the weight of active carbon.

What is claimed is:

1. An aqueous hybrid super capacitor, wherein is comprised of at least a super capacitor positive electrode, at least a gas generating electrode which has oxygen generating activity, and at least a zinc negative electrode, all the three electrodes are separated by the electrolyte with pH value above 2.5; the super capacitor positive electrode and the zinc negative electrode are capable of performing cycle of charging and discharging; the gas generating electrode and the zinc negative electrode are capable of performing charging to get the zinc negative electrode to recover;
   wherein said gas generating electrode has hydrogen generating activity, the zinc layer is the part formed by the accumulation of zinc, the gas-generating electrode is capable of being connected with the zinc negative electrode to reduce the thickness of the zinc layer.

2. An aqueous hybrid super capacitor as defined in claim 1, wherein the gas-generating electrode is comprised of stainless steel material and metallic nickel material.

3. An aqueous hybrid super capacitor as defined in claim 1, wherein gas generating electrode is comprised of nickel or nickel plated metallic materials.

4. An aqueous hybrid super capacitor as defined in claim 1, wherein gas generating electrode is comprised of stainless steel material.

5. An aqueous hybrid super capacitor as defined in claim 1, wherein using stainless steel materials as a current collector of said super capacitor positive electrode.

6. An aqueous hybrid super capacitor as defined in claim 1, wherein using nickel or nickel plated metallic materials as the current collector of said super capacitor positive electrode.

7. An aqueous hybrid super capacitor as defined in claim 1, wherein using brass or copper materials as the current collector of said zinc negative electrode.

8. An aqueous hybrid super capacitor as defined in claim 1, wherein using the electrolyte in a flowing mode.

9. An aqueous hybrid super capacitor as defined in claim 1, wherein use alkaline solution as Said electrolyte.

* * * * *